(12) United States Patent
Choi et al.

(10) Patent No.: US 11,508,375 B2
(45) Date of Patent: Nov. 22, 2022

(54) ELECTRONIC APPARATUS INCLUDING CONTROL COMMAND IDENTIFICATION TOOL GENERATED BY USING A CONTROL COMMAND IDENTIFIED BY VOICE RECOGNITION IDENTIFYING A CONTROL COMMAND CORRESPONDING TO A USER VOICE AND CONTROL METHOD THEREOF

(71) Applicant: Samsung Electronics Co., Ltd., Suwon-si (KR)

(72) Inventors: Woojei Choi, Suwon-si (KR); Minkyong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

(21) Appl. No.: 16/903,918

(22) Filed: Jun. 17, 2020

(65) Prior Publication Data
US 2021/0005205 A1    Jan. 7, 2021

Related U.S. Application Data

(60) Provisional application No. 62/870,222, filed on Jul. 3, 2019.

(30) Foreign Application Priority Data

Jan. 31, 2020  (KR) .......................... 10-2020-0012154

(51) Int. Cl.
*G10L 15/22* (2006.01)
*G10L 15/26* (2006.01)
(Continued)

(52) U.S. Cl.
CPC .............. *G10L 15/26* (2013.01); *G10L 15/16* (2013.01); *G10L 15/22* (2013.01); *G10L 17/24* (2013.01)

(58) Field of Classification Search
CPC ...................................................... G10L 15/22
See application file for complete search history.

(56) References Cited

U.S. PATENT DOCUMENTS 6,425,046 B1    7/2002    Leung et al.
9,021,139 B1    4/2015    Kim et al.
(Continued)

FOREIGN PATENT DOCUMENTS

EP    0 654 168 B1    10/2001
EP    3 157 229 A1    4/2017
(Continued)

OTHER PUBLICATIONS

International Search Report dated Sep. 25, 2020, issued in International Application No. PCT/KR2020/007808.

*Primary Examiner* — Jialong He
(74) *Attorney, Agent, or Firm* — Jefferson IP Law, LLP

(57) ABSTRACT

An electronic apparatus is provided. The electronic apparatus includes a microphone, a transceiver, a memory configured to store a control command identification tool based on a control command identified by a voice recognition server that performs voice recognition processing on a user voice received from the electronic apparatus, and at least one processor configured to, based on the user voice being received through the microphone, acquire user intention information by performing the voice recognition processing on the received user voice, receive status information of external devices related to the acquired user intention information from a device control server, identify a control command for controlling a device to be controlled among the plurality of external devices by applying the acquired user intention information and the received status information of the external devices to the control command identification tool, and transmit the identified control command to the device control server.

12 Claims, 6 Drawing Sheets

(51) Int. Cl.
    *G10L 17/24*    (2013.01)
    *G10L 15/16*    (2006.01)

(56) References Cited

U.S. PATENT DOCUMENTS

| | | | |
|---|---|---|---|
| 9,497,196 | B2 | 11/2016 | Kim et al. |
| 9,553,876 | B2 | 1/2017 | Kim et al. |
| 9,582,245 | B2 | 2/2017 | Kim et al. |
| 9,606,949 | B1 | 3/2017 | Yong et al. |
| 9,923,821 | B2 | 3/2018 | Nolan et al. |
| 10,018,977 | B2 | 7/2018 | Cipollo et al. |
| 10,097,379 | B2 | 10/2018 | Nolan et al. |
| 10,097,984 | B2 | 10/2018 | Kim et al. |
| 10,120,645 | B2 | 11/2018 | Kim et al. |
| 10,148,737 | B2 | 12/2018 | Choi et al. |
| 10,158,536 | B2 | 12/2018 | Kim et al. |
| 10,209,693 | B2 | 2/2019 | Welingkar et al. |
| 10,586,536 | B2 | 3/2020 | Jeong |
| 10,650,816 | B2 | 5/2020 | Lee et al. |
| 10,685,669 | B1* | 6/2020 | Lan ................ G10L 15/1822 |
| 10,909,983 | B1* | 2/2021 | Peng ................ G10L 15/1815 |
| 11,086,596 | B2 | 8/2021 | Kim et al. |
| 2013/0238326 | A1* | 9/2013 | Kim ................ G10L 15/22 704/231 |
| 2014/0092007 | A1 | 4/2014 | Kim et al. |
| 2014/0095174 | A1 | 4/2014 | Kim et al. |
| 2014/0095176 | A1 | 4/2014 | Kim et al. |
| 2014/0343946 | A1* | 11/2014 | Torok ................ G10L 15/30 704/270.1 |
| 2015/0325239 | A1* | 11/2015 | Liu ................ H04R 1/08 704/246 |
| 2016/0026729 | A1 | 1/2016 | Gil et al. |
| 2016/0028605 | A1 | 1/2016 | Gil et al. |
| 2017/0004828 | A1* | 1/2017 | Lee ................ G10L 17/24 |
| 2017/0256260 | A1 | 9/2017 | Jeong |
| 2017/0270919 | A1 | 9/2017 | Parthasarathi et al. |
| 2017/0345420 | A1 | 11/2017 | Barnett, Jr. |
| 2018/0061223 | A1* | 3/2018 | Shin ................ G05B 15/02 |
| 2018/0189661 | A1 | 7/2018 | Tatourian et al. |
| 2018/0213018 | A1 | 7/2018 | Madani et al. |
| 2018/0308470 | A1 | 10/2018 | Park et al. |
| 2018/0322870 | A1 | 11/2018 | Lee et al. |
| 2018/0349946 | A1 | 12/2018 | Nguyen et al. |
| 2019/0026073 | A1* | 1/2019 | Kim ................ H04L 12/281 |
| 2019/0026075 | A1 | 1/2019 | Kim et al. |
| 2019/0044949 | A1 | 2/2019 | Bartfai-Walcott et al. |
| 2019/0115025 | A1 | 4/2019 | Choi |
| 2019/0206411 | A1* | 7/2019 | Li ................ G06F 3/167 |
| 2019/0304450 | A1* | 10/2019 | Kwon ................ G10L 15/26 |
| 2020/0143017 | A1 | 5/2020 | Yoon et al. |

FOREIGN PATENT DOCUMENTS

| | | |
|---|---|---|
| EP | 3 395 048 A1 | 10/2018 |
| KR | 10-0426729 B1 | 4/2004 |
| KR | 10-2014-0042642 A | 4/2014 |
| KR | 10-2016-0029450 A | 3/2016 |
| KR | 10-2018-0084591 A | 7/2018 |
| KR | 10-2019-0031167 A | 3/2019 |
| KR | 10-1957169 B1 | 3/2019 |
| KR | 10-2019-0042919 A | 4/2019 |
| WO | 2017/112366 A1 | 6/2017 |
| WO | 2019/083102 A1 | 5/2019 |

\* cited by examiner

100'

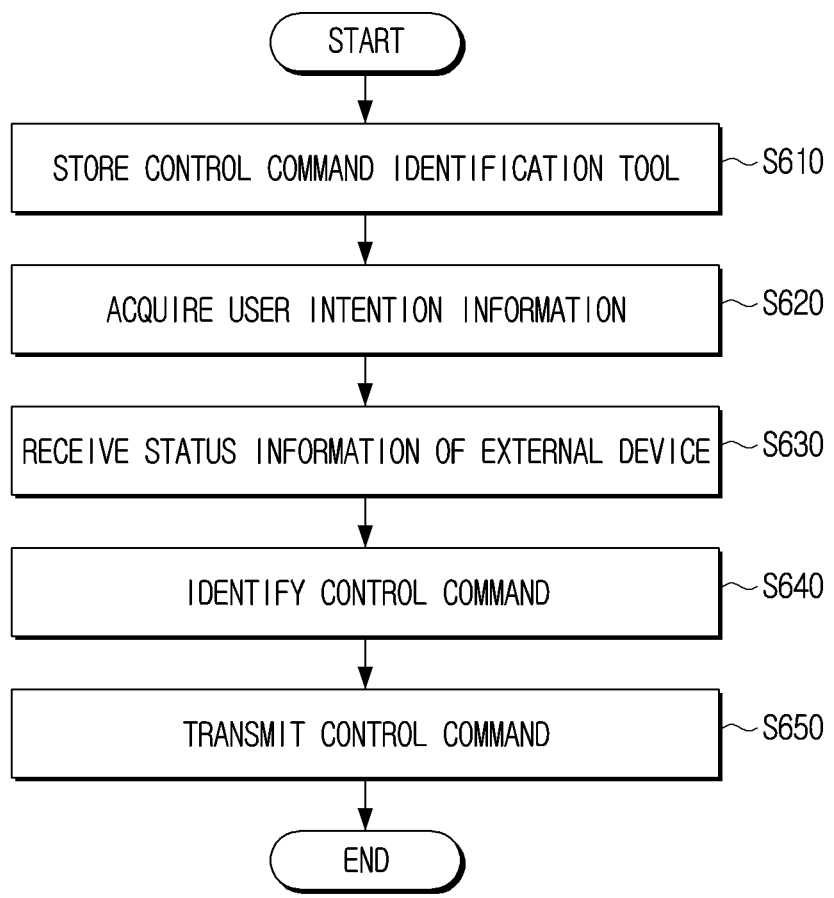

ELECTRONIC APPARATUS INCLUDING CONTROL COMMAND IDENTIFICATION TOOL GENERATED BY USING A CONTROL COMMAND IDENTIFIED BY VOICE RECOGNITION IDENTIFYING A CONTROL COMMAND CORRESPONDING TO A USER VOICE AND CONTROL METHOD THEREOF

CROSS-REFERENCE TO RELATED APPLICATION(S)

This application is based on and claims priority under 35 U.S.C. § 119(a) of a Korean patent application number 10-2020-0012154, filed on Jan. 31, 2020, in the Korean Intellectual Property Office, and under 35 U.S.C. § 119(e) of a U.S. Provisional application Ser. No. 62/870,222, filed on Jul. 3, 2019, in the U.S. Patent and Trademark, the disclosure of each of which is incorporated by reference herein in its entirety.

BACKGROUND

1. Field

The disclosure relates to an electronic apparatus and a control method thereof. More particularly, the disclosure relates to an electronic apparatus for controlling an external device through a user voice and a control method thereof.

2. Description of the Related Art

With the recent development of network communication technology and voice recognition technology, a user can control operations of various electronic apparatuses connected through a network by voice. For example, a user can control operations of various electronic apparatuses by uttering a voice command to a hub device (e.g., an artificial intelligence (AI) speaker, etc.) in an Internet of Things (IoT) environment or a home network environment.

Such a user voice command received through the hub device is analyzed and processed through a cloud to control a device. However, a delay may occur during analyzing or processing, thereby decreasing a reaction speed felt by the user.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. One aspect of the disclosure is to provide an electronic apparatus that can quickly and accurately control devices through a user voice in a multi-device environment, and a control method thereof. Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a microphone, a transceiver or communicator including circuitry, a memory configured to store a control command identification tool based on a control command identified by a voice recognition server that performs voice recognition processing on a user voice received from the electronic apparatus, and at least one processor.

In accordance with another aspect of the disclosure, the at least one processor is configured to, based on the user voice being received through the microphone, acquire user intention information by performing the voice recognition processing on the received user voice, receive status information of external devices related to the acquired user intention information from a device control server configured to control a plurality of external devices through the communicator, identify a control command for controlling a device to be controlled among the plurality of external devices by applying the acquired user intention information and the received status information of the external devices to the control command identification tool, and transmit the identified control command to the device control server through the communicator.

In accordance with another aspect of the disclosure, a control method of an electronic apparatus is provided. The control method includes storing a control command identification tool based on a control command identified by a voice recognition server configured to perform voice recognition processing on a user voice received by the electronic apparatus, based on the user voice being received, acquiring user intention information by performing the voice recognition processing on the received user voice, receiving status information of an external device related to the acquired user intention information from a device control server configured to control a plurality of external devices, applying the acquired user intention information and the received status information of the external device to the control command identification tool, identifying a control command for controlling a device to be controlled among the plurality of external devices, and transmitting the identified control command to the device control server.

In accordance with another aspect of the disclosure, a voice recognition server is provided. The voice recognition server includes a transceiver or communicator, a memory configured to store a control command identification tool based on a control command that the voice recognition server identifies based on a user voice received from an electronic apparatus, and at least one processor.

In accordance with another aspect of the disclosure, the at least one processor is configured to, based on the user voice being received from the electronic apparatus through the communicator, acquire user intention information by performing a voice recognition processing on the received user voice, receive status information of an external device related to the acquired user intention information from a device control server configured to control a plurality of external devices through the communicator, identify a control command for controlling the device to be controlled among the plurality of external devices by applying the acquired user intention information and the received status information of the external device to the control command identification tool, and transmit the identified control command to the device control server through the communicator.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent

FIG. 6 is a flowchart illustrating a control method of an electronic apparatus according to an embodiment of the disclosure.

Throughout the drawings, like reference numerals will be understood to refer to like parts, components, and structures.

DETAILED DESCRIPTION

Figure 1:
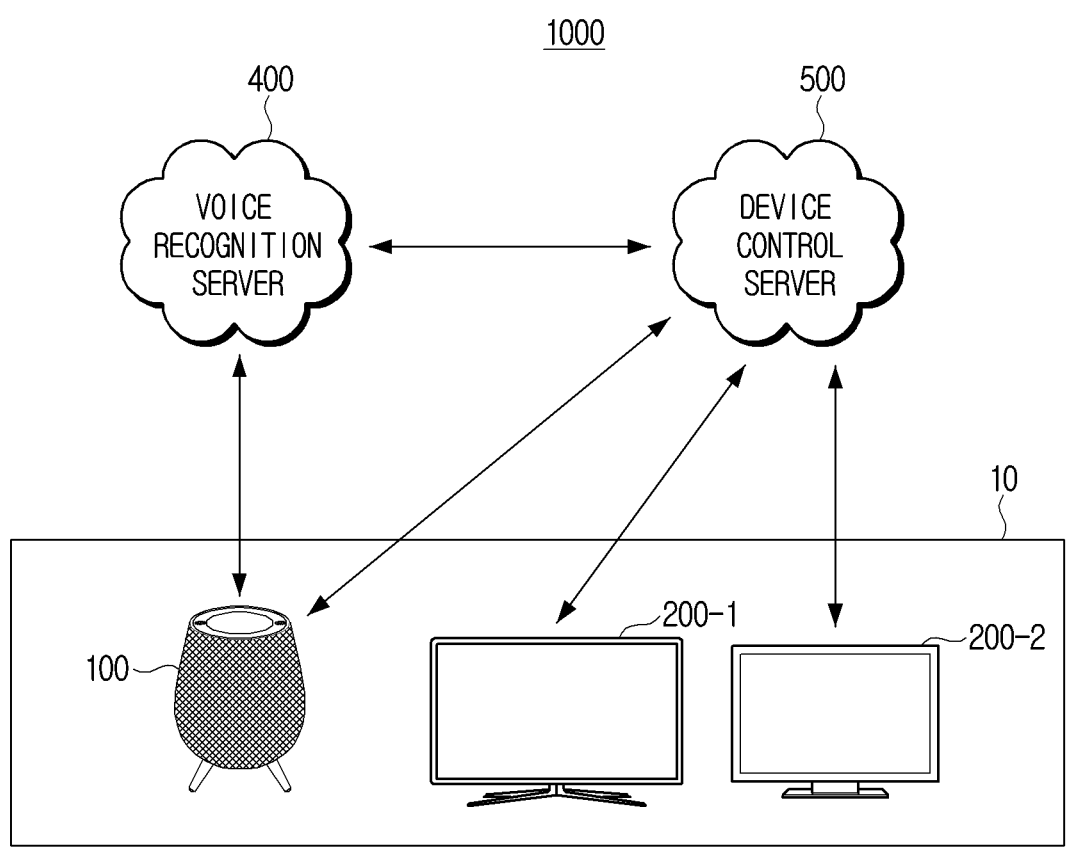
FIG. 1 is a diagram illustrating a voice control system according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An object of the disclosure is to provide an electronic apparatus that can quickly and accurately control devices through a user voice in a multi-device environment, and a control method thereof.

In the following description, well-known functions or constructions are not described in detail since they would obscure the application with unnecessary detail. In addition, duplicate descriptions of the same construction will be omitted.

Also, the term "unit" is provided for ease of description, and is not intended to have a limiting meaning or purpose. The term "unit" and other terms used in the following description are provided to explain example embodiments and are not intended to limit the scope.

Throughout the specification, it will be understood that the term "comprise" and variations thereof, such as "comprising" and "comprises," specify the presence of features, numbers, operations, components, parts, or combinations thereof, described in the specification, but do not preclude the presence or addition of one or more other features, numbers, operations, components, parts, or combinations thereof.

In the description, the terms "first, second, and so forth" are used to describe diverse elements regardless of their order and/or importance, and to discriminate one element from other elements, but are not limited to the corresponding elements.

When an element (e.g., a first element) is "operatively or communicatively coupled with/to" or "connected to" another element (e.g., a second element), an element may be directly coupled with another element or may be coupled through the other element (e.g., a third element). When an element (e.g., a first element) is "directly coupled with/to" or "directly connected to" another element (e.g., a second element), an element may not be present between the other elements.

Terms used in the embodiments of the disclosure may be interpreted as meanings commonly known to those skilled in the art unless defined otherwise.

Hereinafter, the disclosure will be described in detail with reference to the accompanying drawings.

FIG. 1 is a view illustrating a voice control system according to an embodiment of the disclosure.

Referring to FIG. 1, a voice control system 1000 may include an electronic apparatus 100, external apparatuses 200-1 and 200-2, a voice recognition server 400, and a device control server 500.

The electronic apparatus 100 and the external apparatuses 200-1 and 200-2 may configure a home network environment or an Internet of Things network environment in a home 10 such as a home or office.

The electronic apparatus 100 may be implemented with various types of devices such as smart speakers, artificial intelligence (AI) speakers, smart televisions (TVs), smart refrigerators, smartphones, access points, laptops, desktop personal computers (PCs), tablets, or the like.

However, in the Internet of Things environment, there are no restrictions on the type of things, so the types of external devices 200-1 and 200-2 are also not limited. FIG. 1 illustrates 200-1 as TV 1, and 200-2 as TV 2, but this is only an example, and there is no limitation on the type of things such as an air conditioner, smart lighting, electric fan, washing machine, microwave, door lock, sound bar, home theater, smartphone, TV, refrigerator, or the like, if the device is communicatively connected to the electronic apparatus 100 and its operation can be controlled through the electronic apparatus 100.

The electronic apparatus 100 may control the operation of the external devices 200-1 and 200-2 according to a user voice.

For example, when a user utters a voice for controlling the operation of the external devices 200-1 and 200-2, the electronic apparatus 100 may receive the uttered voice and transmit it to the voice recognition server 400 to control the operations of the external devices 200-1 and 200-2 through the voice recognition server 400 and the device control server 500.

Specifically, the voice recognition server 400 may identify a control command corresponding to the user voice received from the electronic apparatus 100 and transmit the identified control command to the device control server 500.

The control command is a result of user intention information analyzed by the voice recognition server 400 as described in greater detail below, based on status information of the external devices 200-1 and 200-2 received from the device control server 500, and may include information on a device to be controlled that the user wants to control via voice and information on an operation of the device to be controlled.

For example, when the user voice is received from the electronic apparatus 100, the voice recognition server 400 may perform voice recognition processing on the received user voice to obtain user intention information corresponding to the user voice.

The voice recognition processing performed by the voice recognition server 400 includes, but is not limited to, an automatic speech recognition (ASR) processing that converts the user voice into text, and a natural language understanding (NLU) processing so that the machine can understand the user voice converted into text by the ASR process.

The user intention information may include information on an entity and an action as a result of the user voice that the voice recognition processed by the voice recognition server 400 before identifying a control command by using status information of external devices 200-1 and 200-2.

The entity and an operation of the entity as a result of the speech recognition processing may vary depending on the user voice, and in some cases, the entity may not exist or the operation of the entity may not be specified. However, hereinafter, for convenience of description, the entity is specified as the operation of the external devices 200-1 and 200-2 as an example on the premise that the user utters a voice for controlling the operation of the external devices 200-1 and 200-2.

As described above, when the user intention information is acquired, the voice recognition server 400 may request entities related to the acquired user intention information, that is, status information of the external devices 200-1 and 200-2 to the device control server 500.

The status information is information related to a current operating status of the external devices 200-1 and 200-2, and may include, for example, information on power on/off status of the external devices 200-1 and 200-2, setting information related to functions of the external devices 200-1 and 200-2, location information of the home 10 of the external devices 200-1 and 200-2, or the like, but is not limited thereto.

When the requested status information is received from the device control server 500, the voice recognition server 400 may interpret the user intention information based on the received status information of the external devices 200-1 and 200-2 to identify the control command.

For example, based on the state information of the external devices 200-1 and 200-2, the voice recognition server 400 may identify whether the controlled device and the operation of the device to be controlled can be specified only based on user intention information, and if specified, identify a control command including information on the specified device to be controlled and its operation, without further analysis.

However, when the device to be controlled and its operation are not specified only by the user intention information, the voice recognition server 400 may further interpret the user intention information according to its own policy of the voice recognition server 400 to identify a control command as described in greater detail below.

The voice recognition server 400 may transmit the control command identified as described above to the device control server 500, and the device control server 500 may control the device to be controlled based on the control command received from the voice recognition server 400.

The device control server 500 may register devices connected to the device control server 500 through a network for each user account, and collect and manage status information of the registered devices. In FIG. 1, the device control server 500 may register the electronic apparatus 100 and external devices 200-1 and 200-2, and collect and manage the electronic apparatus 100 and external devices 200-1 and 200-2.

Therefore, when a transmitting of status information of the external devices 200-1 and 200-2 is requested from the voice recognition server 400, the device control server 500 may respond to the request and transmit the status information of the external devices 200-1 and 200-2 to the voice recognition server 400.

The device control server 500 may also store and manage a set of control signals for each of the registered devices. The set of control signals refers to a set of control codes capable of controlling various operations of the corresponding device.

Even if a control command is related to the same operation, since a control code may be different for each device by manufacturer or by model, the device control server 500 may store and manage the set of control signals for each device to control the operation of the registered devices. The set of control signals may be directly received from the device or may be acquired through a server managed by a device manufacturer.

Therefore, when a control command is received from the voice recognition server 400, the device control server 500 may check the control signal corresponding to the device to be controlled and the operation of the device to be controlled from the set of control signals, and transmit the checked control signal to the device to be controlled in order to control the operation of the device to be controlled.

Hereinafter, operations of the voice recognition system 100 will be described with a specific example, but embodiments are not limited thereto. For example, as illustrated in FIG. 1, the electronic apparatus 100, TV 1 200-1, and TV 2 200-2 constitute an IoT network in the home 10, and TV 1 200-1 and TV 2 200-2 are registered in the device control server 500 through a user account. In this case, the user may utter for example, "Turn on the TV" to the electronic apparatus 100 without specifying which TV.

The electronic apparatus 100 may transmit the user voice to the voice recognition server 400, and the voice recognition server 400 may process the received user voice by ASR to obtain an ASR processing result such as "Turn on the TV," and process the ASR processing result by NLU to acquire user intention information such as "TV power-on." The entity included in the user intention information may be "TV," and the operation of the entity may be "power-on."

When the user intention information is acquired as described above, the voice recognition server 400 may request the external device related to the user intention information, that is, status information of the TV.

Since the TV registered in the device control server 500 has both TV 1 200-1 and TV 2 200-2, the device control server 500 may respond to the request of the voice recognition server 400, and transmit status information of TV 1 200-1 and status information of TV 2 200-2, at the time when the status information transmission is requested, to the voice recognition server 400.

Accordingly, the voice recognition server 400 may identify whether the control command is specified only by the user intention information based on the received status information of TV 1 200-1 and TV 2 200-2.

In the example above, the entity included in the user intention information is "TV," but the status information for each of TV 1 200-1 and TV 2 200-2 has been received from the device control server 500. Accordingly, whether the TV is TV 1 200-1 or TV 2 200-2 may not be specified only by the user intention information.

That is, since the device to be controlled is not specified only by the user intention information, the voice recognition server 400 may identify that the control command cannot be specified only by the user intention information, and identify the control command according to its own policy.

The policy of the voice recognition server 400 is a means for the voice recognition server 400 to identify the control command itself, and may include, for example, a policy for identifying the control command through the user's response to a query, but is not limited thereto.

In the example above, the voice recognition server 400 may transmit a query asking which TV of TV 1 200-1 or TV 2 200-2 to turn on to the electronic apparatus 100 and output the received query. Accordingly, when the user utters a response such as "TV 1," the electronic apparatus 100 may receive and transmit it to the voice recognition server 400, and the voice recognition server 400 may identify the TV 1 200-1 as the device to be controlled based on the received voice.

Accordingly, the voice recognition server 400 may identify "TV 1 power-on" as a control command corresponding to "Turn on TV" and transmit the identified control command to the device control server 500. The device to be controlled may be "TV 1 200-1," and the operation of the device to be controlled may be "power-on."

As a further example, unlike the example above, if only one TV is registered in the user account, only the status information on the one registered TV may be received from the device control server 500, so the voice recognition server 400 may specify the device to be controlled only with the user intention information. Therefore, the voice recognition server 400 may identify the control command "TV power-on" including the specified device to be controlled "TV" and the specified operation "power-on" without additional interpretation such as using its own policy. This may be the same when the user specifies a device to be controlled such as "Turn on the TV 1 200-1" and utters it from the beginning, even when a plurality of TVs are registered.

When a control command such as "TV 1 power-on" is received, the device control server 500 may check a control signal corresponding to "power-on" in the set of control signals corresponding to TV 1 200-1, and transmit the identified control signal to TV 1 200-1. Accordingly, TV 1 200-1 may be turned on, and the user may watch broadcast programs through TV 1 200-1.

As described above, according to an embodiment of the disclosure, the electronic apparatus 100 may transmit the received user voice to the voice recognition server 400, thereby controlling the external devices 200-1 and 200-2 through a control command identified by the voice recognition server 400.

According to an embodiment of the disclosure, the electronic apparatus 100 may directly identify the control command for the received user voice and control the operation of the external devices 200-1 and 200-2.

The electronic apparatus 100 may also generate a tool for identifying the control command based on history information of control of the external devices 200-1 and 200-2 through the voice recognition server 400, and identify the control command based on the generated control command identification tool.

The control command identification tool may be an artificial intelligence model provided by 1) inputting a rule that user intention information, status information of an external device, and a control command match each other, or by 2) outputting a control command.

For this operation, the electronic apparatus 100 may include a voice recognition function, and acquire user intention information by performing voice recognition processing on the received user voice.

The voice recognition function of the electronic apparatus 100 may include at least one of the ASR processing and the NLU processing described above.

For example, when the electronic apparatus 100 includes both ASR and NLU processing functions, the electronic apparatus 100 may acquire user intention information by performing voice recognition processing on the received user voice.

In addition, when the electronic apparatus 100 includes only the ASR processing function, the electronic apparatus 100 may transmit the result of the ASR processing for the user voice to the voice recognition server 400, and acquire the NLU processing result, that is user intention information, from the voice recognition server 400.

In addition, when the electronic apparatus 100 includes only the NLU function, the electronic apparatus 100 may transmit the received user voice to the voice recognition server 400 and perform NLU processing on the result of the ASR processing received from the voice recognition server 400 to acquire user intention information.

When the electronic apparatus 100 processes the user voice using its ASR processing function or NLU processing function, but a reliability of the processing result is less than a certain level, the electronic apparatus 100 may request ASR processing and/or NLU processing with respect to the user voice from the voice recognition server 400, and acquire the requested processing result from the voice recognition server 400 as described in greater detail below.

Accordingly, the electronic apparatus 100 may request and receive status information of the external devices 200-1 and 200-2 related to the acquired user intention information from the device control server 500, and identify the control command by applying the received external devices 200-1 and 200-2 and the acquired user intention information to the control command identification tool.

In addition, the electronic apparatus 100 may control the operation of the external devices 200-1 and 200-2 by directly transmitting the identified control command to the device control server 500 without going through the voice recognition server 400.

As described above, when the electronic apparatus 100 directly identifies a control command by performing voice recognition processing on the received user voice or directly transmits the identified control command to the device control server 500, it may provide faster control quicker than when it identifies and transmits the control command through the voice recognition server 400.

When the control command is identified using the control command determination tool, since the control command is identified through a relatively simple operation such as comparing user intention information and state information of the external devices 200-1 and 200-2 with a rule or inputting it into an artificial intelligence model, this operation may identify a control command faster than the case of identifying the control command by using its own policy of the foregoing voice recognition server 400. Accordingly, when the voice recognition server 400 identifies the control command through its own policy, a delay that can be occurred may be improved.

Hereinafter, an operation of the electronic apparatus 100 according to an embodiment of the disclosure will be described in detail with reference to FIG. 2.

Figure 2:
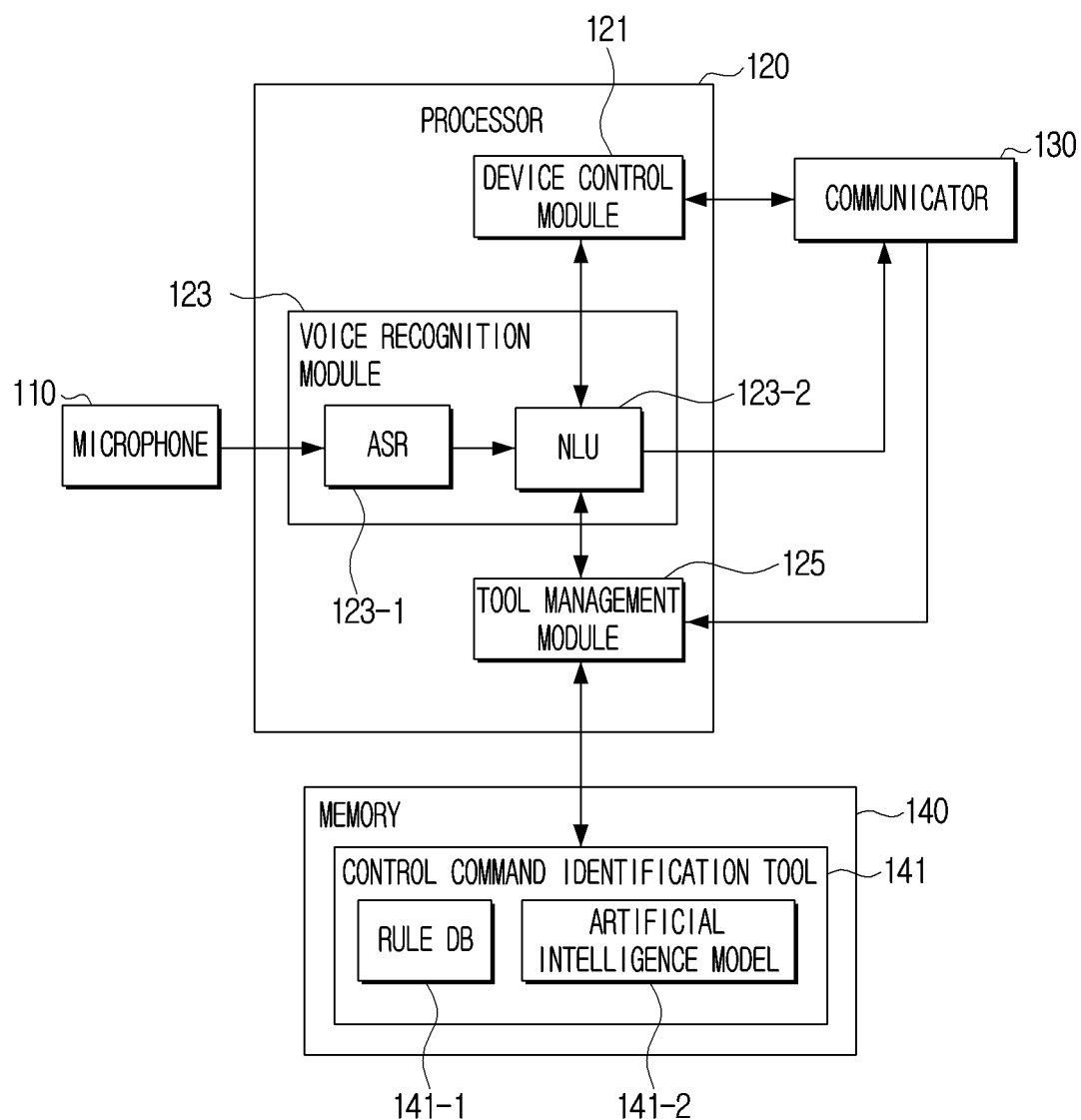
FIG. 2 is a block diagram illustrating an electronic apparatus according to an embodiment of the disclosure.

FIG. 2 is a block diagram of an electronic apparatus according to an embodiment of the disclosure.

Referring to FIGS. 1 and 2, the electronic apparatus 100 includes a microphone 110, at least one processor 120, a transceiver or communicator 130, and a memory 140.

The microphone 110 receives sound in the form of sound waves from the outside and converts it into an electrical signal to provide the converted electrical signal to the processor 120. Particularly, the microphone 110 may receive a user voice and provide a corresponding electrical signal to the processor 120.

The communicator 130 is configured to communicate with various external servers or various devices. For example, the communicator 130 may perform communication with the voice recognition server 400 or the device control server 500 to transmit/receive various information or data such as user voice, user intention information, external device status information, control commands, and the like.

In addition, the communicator 130 may configure an IoT environment or a home network environment by performing communication with external devices 200-1 and 200-2 around the electronic apparatus 100.

The memory 140 may store data or information in an electric or magnetic form so that the processor 120 can access stored data or information. For example, the memory 140 may store a control command identification tool 141 that is a basis for identifying a control command, a tool management module 125 for managing the control command identification tool, a voice recognition module 123 for performing a voice recognition function and identifying a control command, a device control module 121 for monitoring status information of the external devices 200-1 and 200-2 and transmitting and receiving control commands.

The processor 120 controls the overall operations of the electronic apparatus 100. For example, the processor 120 may load a control command identification tool 141, the tool management module 125, the voice recognition module 123, the device control module 121, and the like, stored in the memory 140 and perform functions of each module.

Specifically, FIG. 2 illustrates a state in which the processor 120 loads the device control module 121, the voice recognition module 123, and the tool management module 125 stored in the memory 140 to perform the corresponding function.

The control command identification tool 141 is a means that the voice recognition module 123 (specifically, NLU module 123-2) uses to identify a control command by applying user intention information and status information of an external device as described in greater detail below, and may include a rule generated based on history information in which the electronic apparatus 100 previously controlled an external device, or an artificial intelligence module trained based on the history information in which the electronic apparatus 100 previously controlled an external device.

The history information may include user intention information acquired at the time of the previous control, status information of the external device at the time of the previous control, and/or a control command identified by the voice recognition server 400 at the time of the previous control (particularly, control commands determined by its own policy).

Specifically, a rule data base (DB) 141-1 is a database including a plurality of rules for identifying a control command. The rule DB 141-1 may be in the form of a look-up table in which user intention information, status information of external device, and control commands are matched with each other, as illustrated in Table 1 below, but is not limited thereto.

TABLE 1

|  | User intention information | Status information of external device | Control command |
| --- | --- | --- | --- |
| Rule 1 | TV power-on | TV 1 200-1: off TV 2 200-2: on | TV 1 200-1 power-on |
| Rule 2 | Air conditioner power-on | Air conditioner 1: off Air conditioner 2: off | Air conditioner 2 power-on |

Since the user intention information, the status information of the external device, and the control command are matched with each other in the respective rule of the rule DB 141-1, the voice recognition module 123 as described in greater detail below, can acquire user intention information and the status information of external device corresponding to user voice, and check a rule corresponding to the acquired user intention information and the status information of external device in the rule DB 141-1 to quickly identify a control command.

An artificial intelligence model 141-2 is trained by inputting user intention information and status information of an external device and outputting a control command Therefore, as described in greater detail below, the voice recognition module 123 may quickly acquire a control command by inputting the acquired user intention information and status information of an external device into the trained artificial intelligence model.

The tool management module 125 may manage the control command identification tool 141 stored in the memory 140. When the voice recognition module 123 identifies the control command, the tool management module 125 may access the memory 140 at an appropriate time and load at least some of the control command identification tool 141 in order to use the control command tool 131.

For example, the tool management module 125 may load at least some rules and/or artificial intelligence models 141-2 included in the rule DB 141-1 when the voice recognition module 123 requests. However, the loading time is not limited thereto. For example, the tool management module 125 may load the control command identification tool 131 in the processor 120 at various times before the voice recognition module 123 identifies a control command, such as when the user voice is received or when the electronic apparatus 100 is powered on, or the like.

The tool management module 125 may update the control command identification tool 141 as described in greater detail below.

The device control module 121 may monitor status information of an external device through the device control server 500 and provide it to the voice recognition module 123.

Specifically, when the status information of the external device is requested from the voice recognition module 123, the device control module 121 may request the status information of the external device from the device control server 500 through the communicator 130, and provide status information of the current external device received from the control server 500 to the voice recognition module 123.

When the status information of the external device is requested from the tool management module 125 as in an embodiment described in greater detail below, the device control module 121 may provide the status information received from the device control server 500 to the tool management module 125.

Also, the device control module 121 may transmit a control command determined by the voice recognition module 123 to the device control server 500 to control the operation of the device to be controlled.

Specifically, when a control command is received from the speech recognition module 123, the device control module 121 may transmit the received control command to the device control server 500 through the communicator 130. Accordingly, the device control server 500 may transmit a control signal corresponding to the control command to the device to be controlled, so that the operation of the device to be controlled may be controlled.

The voice recognition module 123 may identify a control command corresponding to the user voice received through the microphone 110. For example, the voice recognition module 123 may perform a voice recognition function. For this operation, the voice recognition module 123 may include an ASR module 123-1 and an NLU module 123-2.

The ASR module 123-1 may recognize a user voice and output the recognized user voice as text. For example, when a user voice such as "Turn on TV" is received through the microphone 110, the ASR module 123-1 may recognize the voice and output text such as "Turn on TV" through the NLU module 123-2.

For this operation, the ASR module 123-1 may include an acoustic model and a language model. The acoustic model may include information related to voice, and the language model may include information on a combination of speech and unit phoneme information. Accordingly, the ASR module 123-1 may convert the user voice into text using information related to speech and unit phoneme information.

The NLU module 123-2 may grasp the meaning of the text received from the ASR module 123-1, that is, user's intention corresponding to the user voice. For example, when a text such as "Turn on TV" is received from the ASR module 123-1, the NLU module 123-2 may analyze it and acquire user intention information such as "TV power-on."

For this operation, the NLU module 123-2 may perform operations such as keyword matching, syntactic analysis, semantic analysis, or the like, on text received from the ASR module 123-1, and determine the user's intention.

In FIG. 2, it has been described that the voice recognition module 123 includes both the ASR module 123-1 and the NLU module 123-2, but embodiments are not limited thereto. For example, the voice recognition module 123 may include only one of the ASR module 123-1 or the NLU module 123-2, and the voice recognition module 123 may request processing corresponding to rules of the remaining modules from the voice recognition server 400 and receive a result of the processing.

The voice recognition module 123 may request the ASR processing and/or the NLU processing with respect to the user voice from the voice recognition server 400 either when the voice recognition processing result, that is, a reliability of the ASR processing and/or when the NLU processing result is less than a certain level, and acquire the processing result as described above.

As such, the voice recognition module 123 may perform voice recognition processing on the user voice received through the microphone 110 to acquire user intention information corresponding to the user voice.

In addition, the voice recognition module 123 may acquire status information of an external device related to user intention information. For example, the operation of the NLU module 123-2 may indicate that the voice recognition module 123 performs in the case of an embodiment that the voice recognition module 123 includes only the ASR module 123-1. In this case, when the user intention information is acquired as described above, the operation of the NLU module 123-2 may receive status information of an external device related to the acquired user intention information from the device control server through the device control module 121.

As described above, when the user intention information and the status information of the external device are acquired, the NLU module 123-2 may request a loading of the rule DB 141-1 among the control command identification tools 141 to the tool management module 125.

Accordingly, when the rule DB 141-1 is loaded in the processor 120, the NLU module 123-2 may check, among the loaded rule DB 141-1, whether the rule in which the acquired user intention information, the user intention information identical to the status information of the external device, and the status information of the external device are matched, exists in the rule DB 141-1 and if so, may identify a control command matched with the corresponding rule as a control command corresponding to the user voice.

For example, based on a history of previously controlled TV 1 200-1 through the voice recognition server 400 as the user utters "Turn on the TV," and where a rule such as Rule 1 in Table 1 is generated and stored in the rule DB 141-1, when the user utters "Turn on the TV" again, the voice recognition module 123 may acquire user intention information of "TV power-on" by performing voice recognition processing on the user voice, and receive the status information of an external device related to the TV from the device control server 500 through the device control module 121. In addition, the NLU module 123-2 may request the tool management module 125 to load the rule DB 141-1 and accordingly, the rule DB 141-1 including the Rule 1 may be loaded in the processor 120.

When the status information of the external device received by the NLU module 123-2 is "TV 1 200-1 off" and "TV 2 200-2 on," since the rule DB 141-1 includes the Rule 1 that the user intention information is "TV power-on" and the status information of the external device is "TV 1 200-1 off" and "TV 2 200-2 on," the voice recognition module 123 may immediately identify "TV 1 200-1 power-on," which is a control command matched to Rule 1, as a control command for "Turn on the TV" currently received.

As described above, the entire rule DB 141-1 stored in the memory 140 is loaded in the processor 140 according to the request of the voice recognition module 123 as an example, but embodiments are not limited thereto.

For example, only rules including external devices related to the user intention information may be loaded in the processor 120. In this case, when the rule DB 141-1 shown in Table 1 is stored in the memory 140 and user intention information of "TV power-on" is acquired as the example described above, the voice recognition module 123 may request the tool management module 125 to load a rule including the external device related to user intention information, that is, a TV. Accordingly, the tool management module 125 may load only the Rule 1 including the TV among the rule DB 141-1 in the processor 120. When the voice recognition module 123 checks whether the matched rule is present or absent, a target to be compared is reduced, so that it may be identified whether the control command is present or absent.

According to another embodiment of the disclosure, when the user intention information and the status information of the external device are acquired, the NLU module 123-2 may request the tool management module 125 to load an artificial intelligence model 141-2 among the control command identification tools 141.

Accordingly, when the artificial intelligence model 141-2 is loaded in the processor 120, the NLU module 123-2 may input the acquired user intention information and status information of the external device to the artificial intelligence model 141-2, and identify a control command (e.g., a control command having the highest probability value among a plurality of control commands) outputted according to thereof as a control command corresponding to the user voice.

For example, based on the history of the previously controlled TV 1 200-1 through the voice recognition server 400 as the user utters "Turn on the TV," when user intention information ("TV power-on") and status information of external devices related to user intention information ("TV 1 200-1 off," "TV 2 200-2 on") are input, and where the artificial intelligence model 141-2 is trained by causing the control command ("TV 1 200-1 power-on") to be output with the highest probability value, when the user utters "Turn on the TV" again, the voice recognition module 123 may perform the voice recognition processing on the user voice to acquire the user intention information of "TV power-on," and the NLU module 123-2 may receive status information of an external device related to the TV from the device control server 500 through the device control module 121.

When the received status information of external device is "TV 1 200-1 off," "TV 2 200-2 on," the NLU module 123-2 may input the currently acquired user intention information "TV power-on" and "TV 1 200-1 off" and "TV 2 200-2 on," which are status information of the currently received external device, to the trained artificial intelligence model 141-2. Accordingly, the NLU module 123-2 may immediately identify the control command outputted from artificial intelligence model 141-2 as the control command with respect to the "Turn on the TV."

According to an embodiment of the disclosure, the NLU module 123-2, before using the control command identification tool 141, as the operation of the voice recognition server 400 of FIG. 1, may first identify whether the control command is specified only with the user intention information based on the acquired user intention information and the status information of external device, and when the control command is specified only with the user intention information, may identify the control command based on the acquired user intention information without using the control command identification tool 141.

For example, in the above example, when there is one TV of the user account registered in the device registration server 500 and status information of a TV called "TV off" is received, since the device to be controlled and the operation of the device to be controlled are specified only by the user intention information, that is "TV power-on," the voice recognition module 123 may not request the control command identification tool 141 from the tool management module 125, and immediately identify the "TV power-on" as a control command with respect to the user voice.

As described above, when the control command corresponding to the user voice is identified, the voice recognition module 121 may control the operation of the device to be controlled by transmitting the identified control command to the device control module 121.

The tool management module 125 may update the rule DB 141-1 or the artificial intelligence model 141-2. For example, if the rule corresponding to the acquired user intention information and the status information of the external device is not presented in the rule DB 141-1, or if a control command is not output (e.g., when there is no control command having a predetermined probability value or more) when the acquired user intention information and the status information of the external device are input into the artificial intelligence model 141-2, the voice recognition module 123 may transmit the acquired user intention information and the status information of external device to the voice recognition server 400.

Accordingly, the voice recognition server 400 may identify a control command corresponding to the user voice and transmit the identified control command to the device control server 500 and the electronic apparatus 100 as described above with reference to FIG. 1. Alternatively, the voice recognition server 400 may transmit the identified control command only to the device control server 500, and the device control server 500 may transmit the control command to the electronic apparatus 100.

The control command transmitted to the device control server 500, as described above in FIG. 1, may be transmitted to the device to be controlled in the form of a control signal and be used to control the operation of the device to be controlled. The control command transmitted to the electronic apparatus 100 is also used to update the rule DB 141-1 or the artificial intelligence model 141-2.

When the control command identified by the voice recognition server 400 is received through the communicator 130, the tool management module 125 may generate a new rule by matching the user intention information and status information of an external device received from the voice recognition module 123 with a control command received from the voice recognition server 400, and update the generated new rule in the rule DB 141-1.

In addition, the tool management module 125 may input the user intention information and the status information of the external device received from the voice recognition module 123, and output the control command received from the voice recognition server 400, thereby training the artificial intelligence model and updating the artificial intelligence model 141-2.

As such, the updated rule DB 141-1 and the artificial intelligence model 141-2 may be used to identify a control command corresponding to the user voice received through the microphone 110.

In the above, it has been described that the tool management module 125 receives both the user intention information and the status information of the external device from the speech recognition module 123, but embodiments are not limited thereto. For example, the voice recognition module 123 may transmit only the acquired user intention information to the tool management module 125. Accordingly, the tool management module 125 may request status information of the external device related to the user intention information received from the speech recognition module 123 to the device control module 121, and receive status information of the external device from the device control module 121.

It has been described that the NLU module 123-2 uses the rule DB 141-1 or the artificial intelligence model 142-2 to identify the control command. However, according to an embodiment of the disclosure, the NLU module 123-2 may first attempt to identify a control command using the rule DB 141-1, and identify the control command by using the artificial intelligence model 141-2 if a rule corresponding to the acquired user intention information and status information of the external device is not presented in the rule DB 141-1.

According to another embodiment of the disclosure, the NLU module 123-2 may first attempt to identify the control command by using the artificial intelligence model 141-2, and identify the control command based on the rule DB 141-1 if the control command having the predetermined probability value or more is not output from the artificial intelligence model 141-2.

In the above two embodiments, if the control command is not identified even when using either the rule DB 141-1 or the artificial intelligence model 141-2, the tool management module 125 may update the rule DB 141-1 and the artificial intelligence model 141-2 as described above.

Hereinafter, various embodiments of the disclosure will be further described with reference to FIGS. 3 to 5. Duplicate descriptions of the same content as described above will be omitted when describing FIGS. 3 to 5.

Figure 3:
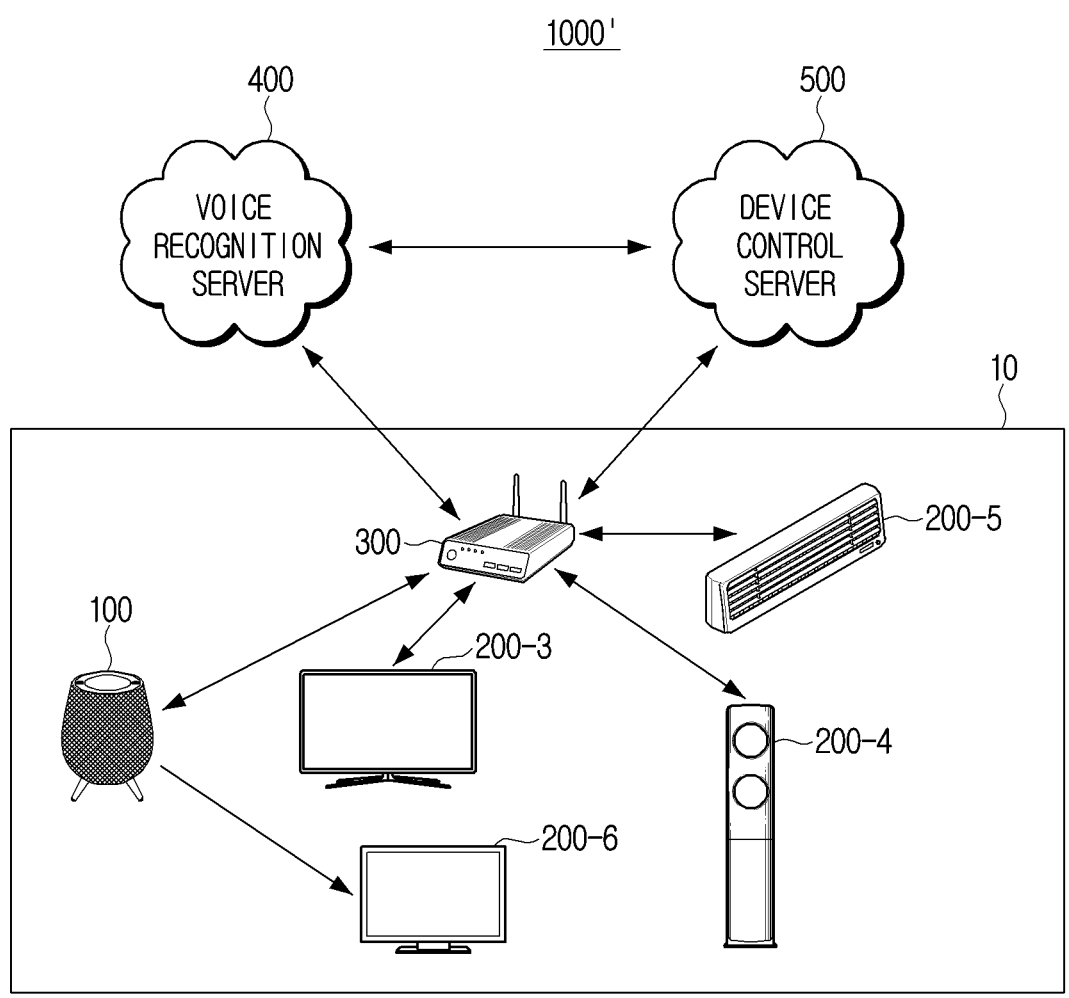
FIG. 3 is a diagram illustrating a voice control system according to an embodiment of the disclosure.

FIG. 3 is a diagram illustrating a voice control system according to an embodiment of the disclosure.

Referring to FIG. 3, a voice recognition system 1000' may include the electronic apparatus 100, a smart TV 200-3, a smart air conditioner 1 200-4, a smart air conditioner 2 200-5, a legacy TV 200-6, an access point 300, a voice recognition server 400 and a device control server 500.

The electronic apparatus 100, the smart TV 200-3, the air conditioner 1 200-4, and the air conditioner 2 200-5 are devices that can connect to the Internet, and constitute an IoT network in the home 10, and may be connected to the voice recognition server 400 and the device control server 500 through the access point 300. With regard to the legacy TV 200-6, the Internet connection is not possible, and its operation can be controlled only by an infrared (IR) communication method.

The voice recognition server 400 and the device control server 500 may be a cloud server, but are not limited thereto.

In the illustrated example, the user may access the device control server 500 to register the smart TV 200-3, air conditioner 1 200-4, air conditioner 2 200-5, and legacy TV 200-6 in the user's account.

The device control server 500 may monitor the status information only for the smart TV 200-3, the air conditioner 1 200-4, and the air conditioner 2 200-5 connected through the access point 300, and control its operation, but may not monitor the status information with respect to the legacy TV 200-6 and control its operation. However, it may be known through the user account of the legacy TV 200-6.

A rule DB described in Table 2 below may be stored in the memory 140 of the electronic apparatus 100 based on history information that previously controlled the external devices.

TABLE 2

|  | User intention information | Status information of external device | Control command |
|---|---|---|---|
| Rule 1 | TV power-on | TV 1 200-3: off<br>TV 2 200-6: on | Legacy TV 200-6 power-on |
| Rule 2 | Air conditioner power-on | Air conditioner 1 200-4: off<br>Air conditioner 2 200-5: off | Air conditioner 2 200-5 power-on |

When a user voice such as "Turn on the TV" is received, the electronic apparatus 100 may obtain user intention information such as "TV power-on" by performing the voice recognition processing on the user voice as described above, and request the status information of the TV from the device control server 500. Accordingly, when status information such as "smart TV 200-3 on" and "legacy TV 200-6" is received, the electronic apparatus 100 may identify the "legacy TV 200-6 power-on" as a control command based on Rule 1 of Table 2.

However, since operation control of the legacy TV 200-6 through the device control server 500 is impossible, the electronic apparatus 100 may transmit the identified control command directly to the legacy TV 200-6 and in this manner control the operation of the legacy TV 200-6. For this operation, the electronic apparatus 100 may include a configuration for transmitting and receiving IR signals such as an IR blaster, or the like.

While both the air conditioner 1 200-4 and the air conditioner 2 200-5 are off, when the user utters "Turn on air the conditioner," the electronic apparatus 100 may identify a control command such as "air conditioner 2 200-5 power-on" according the Rule 2 of Table 2. Since the operation control of the air conditioner 2 200-5 through the device control server 500 is possible, the electronic apparatus 100 may control the operation of the air conditioner 2 200-5 by transmitting a command to the device control server 500.

However, the embodiment is not limited thereto. That is, even when operation control through the device control server 500 is possible, the electronic apparatus 100 may directly transmit a control command to the air conditioner 2 200-5 through a communication method between devices, such as Wi-Fi direct, according to an embodiment, and control the operation of the air conditioner 2 200-5.

Figure 4:
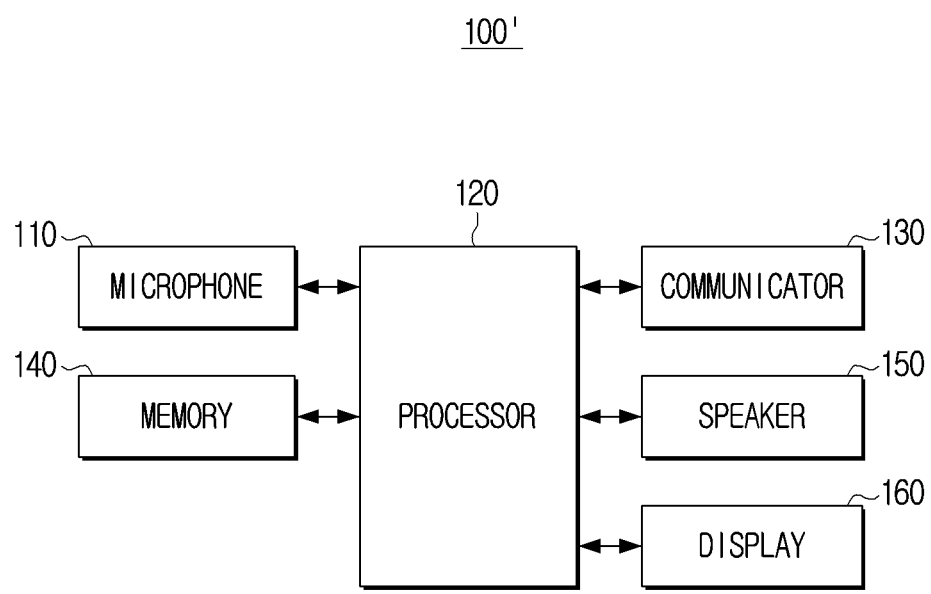
FIG. 4 is a block diagram illustrating an electronic apparatus according to an embodiment of the disclosure.

FIG. 4 is a block diagram illustrating an electronic apparatus according to an embodiment of the disclosure.

Referring to FIG. 4, an electronic apparatus 100' may include the microphone 110, the communicator 130, the memory 140, a display 160, and a speaker 150.

The microphone 110 may be implemented as one or more microphones, implemented integrally with the electronic apparatus 100', or may be implemented as a separate type. A separate microphone refers to a form in which the microphone is not included in the main body of the electronic apparatus 100' and is separately connected to the electronic apparatus 100' by wired or wireless communication.

The communicator 130 may refer to a transceiver or other hardware capable of transmitting and receiving various information (or data) by performing communication with various servers or devices.

The communicator 130 may transmit and receive various information with external servers 400 and 500 or devices 200-1 to 200-6 by using communication protocols such as transmission control protocol/internet protocol (TCP/IP), user datagram protocol (UDP), hyper text transfer protocol (HTTP), secure hyper text transfer protocol (HTTPS), file transfer protocol (FTP), secure file transfer protocol (SFTP), message queuing telemetry transport (MQTT), or the like.

The communicator 130 may be connected to various servers 400 and 500 and a plurality of external devices 200-1 to 200-6 through various networks. The network may include a personal area network (PAN), a local area network (LAN), a wide area network (WAN), or the like, depending on the area or scale, and may include the Intranet, the Extranet, the Internet, or the like, depending on an openness of the network.

The communicator 130 may include at least one communication module among a near-field wireless communication module (not illustrated) and a wireless LAN communication module (not illustrated). The near-field wireless communication module (not illustrated) is a communication module that performs data communication wirelessly with an external device located in a near-field, and may be, for example, a Bluetooth module, a ZigBee module, a near field communication (NFC) module, an infrared communication module, an IR communication module, a Wi-Fi module (when using Wi-Fi P2P function), or the like. In addition, the wireless LAN communication module (not illustrated) is a module that is connected to an external network according to wireless communication protocols such as Wi-Fi, Institute of Electrical and Electronics Engineer (IEEE), or the like, to communicate with an external server or external device.

The communicator 130 may further include a mobile communication module that performs communication by connecting to a mobile communication network according to various mobile communication standards such as 3rd Generation (3G), 3rd generation partnership project (3GPP), long term evolution (LTE), 5th Generation (5G) mobile communications, or the like, according to an embodiment, and may further include a wired communication according to communication standards such as high-definition multimedia interface (HDMI), universal serial bus (USB), IEEE 1394, recommended standard (RS)-232, RS-422, or the like.

The communicator 130 may also include a network interface or a network chip according to the wired/wireless communication method described above. In addition, the communication method is not limited to the foregoing examples, and may include any communication method newly emerging with the development of technology.

The memory 140 may store an operating system (O/S) for operating the electronic apparatus 100' or the processor 120, various programs or applications, and data. Specifically, the memory 140 may store at least one instruction, module, or data required to operate the electronic apparatus 100' or the processor 120.

An instruction includes a code unit indicating an operation of the electronic apparatus 100' or the processor 120, and may be written in machine language, which is a language understood by a computer. A module may be an instruction set that performs a specific task in a unit of work. Data may be information in the form of bits or bytes that can represent characters, numbers, images, or the like.

The memory 140 may be accessed by the processor 120, and perform readout, recording, correction, deletion, update, and the like, on an artificial intelligence model as controlled by the processor 120.

The memory may include an internal memory and/or external memory. The internal memory may include at least one of a volatile or non-volatile memory. The volatile memory may be, for example, dynamic random access memory (RAM) (DRAM), static RAM (SRAM), synchronous dynamic RAM (SDRAM), or the like. The non-volatile memory may be, for example, one time programmable read only memory (ROM) (OTPROM), programmable ROM (PROM), erasable and programmable ROM (EPROM), electrically erasable and programmable ROM (EPMROM), mask ROM, flash ROM, NAN flash memory, NOR flash memory, or the like. Also, the internal memory may be a solid state drive (SSD). The external memory may include flash drive, CompactFlash (CF), secure digital (SD), micro-SD, mini-SD, extreme digital (xD), memory stick, or the like. The external memory may be connected functionally or physically to the electronic apparatus 100' through a variety of interfaces. In addition, the electronic apparatus 100' may further include a storage device such as a hard drive.

The speaker 150 is a device that outputs an electrical signal in an audible form (e.g., voice). The speaker 150 may be configured to output various kinds of alarm sounds or voice messages in addition to various audio data on which various processing operations such as decoding, amplification, and noise filtering are performed by an audio processor. For example, when a query according to its own policy of the voice recognition server 400 is received through the communicator 130, the speaker 150 may output the received query in voice form.

The display 160 is a device that outputs information in a visual form (e.g., graphic, text, image, etc.). The display 160 may display an image frame on all or part of the display area. For example, when a query according to its own policy of the voice recognition server 400 is received through the communicator 130, the display 160 may output the received query in text form.

The processor 120 may read various programs (e.g., at least one instruction, module, etc.) or data stored in the memory 140 to perform operations of the electronic apparatus 100' according to various embodiments of the disclosure.

The rule DB, artificial intelligence model, voice recognition module, device control module, etc. stored in the memory 140 may be loaded by the processor 120 to perform respective functions. For this operation, the processor 120 may include internal memory for loading at least a portion of various programs and data stored in the memory 140.

The processor 120 may also include one or more among a central processing unit (CPU), a controller, an application processor (AP), a microprocessor unit (MPU), and a communication processor (CP), a graphic processing unit (GPU), a vision processing unit (VPU), a neural processing unit (NPU), or an advanced reduced instruction set computer (RISC) machine (ARM) processor.

In FIG. 2, when the rule corresponding to the acquired user intention information and the status information of the external device does not exist in the rule DB 141-1, or when the acquired user intention information and the status information of the external device is input to the artificial intelligence model 141-2, but a control command is not output, it is described that the user voice is transmitted to the voice recognition server 400, but embodiments are not limited thereto.

That is, according to embodiments, if the user voice is received, the processor 120 may always transmit the received user voice to the voice recognition server 400 regardless of whether a corresponding rule exists or whether a control command is output from the artificial intelligence model.

In this embodiment, when the corresponding rule exists in the rule DB 141-1 or a control command is output from the artificial intelligence model, control commands identified by each of the electronic apparatus 100 and the voice recognition server 400 are transmitted to the device control server 500, respectively, and the device control server 500 may receive the same control commands from the electronic apparatus 100' and the voice recognition server 500, respectively.

In this case, the device control server 500 receiving the two control commands ignores the second control command, or the control device receiving the two control signals ignores the second control signal, so that an error wherein the control device performs the same operation twice may be prevented.

The control command that the device control server 500 receives for the second time or the control signal that the control to be controlled for the second time may mostly be a control command transmitted by the voice recognition server 400 and a control signal thereof. This is because the control command identified by the control command identification tool 141 is faster than the control command identified by the voice recognition server 400.

FIG. 1 and FIG. 2 require additional analysis of the voice recognition server 400, so it has been described that the device to be controlled is not specified only by user intention information, but it is not limited thereto, and even if the device to be controlled is specified, additional analysis of the voice recognition server 400 is required even when an operation of the device to be controlled is not specified.

For example, if one TV 200-1 is registered in the user account, and the user utters for example, "Turn on MBC," the electronic apparatus 100' may acquire user intention information such as "TV Channel MBC" through the voice recognition processing and request status information of "TV" to the device control server 500.

At this time, when the TV 1 200-1 is turned on, the device control server 500 may transmit status information such as "TV 1 200-1 on" to the electronic apparatus 100'. The status information of the TV 1 200-1 is not limited to on/off information, as described above in the description of FIG. 1. For example, information about a current broadcast channel being played on the TV 1 200-1, information about the volume of the currently set TV 1 200-1, etc., may be further included in the status information according to an embodiment.

However, where there are no rules related to "Turn on MBC," and the artificial intelligence model is not trained, since the electronic apparatus 100' may not know what channel number is "MBC", it may transmit the user voice to the voice recognition server 400.

Accordingly, the voice recognition server 400 may also acquire user intention information such as "TV Channel MBC" through the voice recognition processing, and receive the same status information as "TV 1 200-1 on" from the device control server 500.

Since the voice recognition server 400 may also not know what the channel number is "MBC", it may identify that the device to be controlled, that is, an operation of the TV 1 200-1 is not specified only by the user intention information, and may determine that the channel number of MBC is 11 through additional interpretation according to its own policy such as the user query.

Accordingly, the voice recognition server 400 may identify the control command such as "TV 1 200-1 Channel 11" and transmit it to the device control server 500, and accordingly, the channel of the TV 1 200-1 may be changed.

The voice recognition server 400 or the device control server 500 may transmit the control command identified by the voice recognition server 400 to the electronic apparatus 100', and accordingly, the processor 120 of the electronic apparatus 100' may generate a rule as shown in Rule 1 of Table 3 below and update the rule DB 141-1.

TABLE 3

| | User intention information | Status information of external device | Control command |
|---|---|---|---|
| Rule 1 | TV Channel MBC | TV 1 200-1: off<br>TV 2 200-2: on | TV 1 200-1 power-on |
| Rule 2 | Air conditioner power-on | Air conditioner 1: off<br>Air conditioner 2: off | Air conditioner 2 power-on |

Thereafter, when the TV 1 200-1 is turned on and the user utters for example, "Turn on MBC" again, the processor 120 may quickly identify a control command using Rule 1 of Table 3 above.

Various examples in which the electronic apparatus 100' identifies a control command corresponding to the user voice using the control command identification tool 141 have been described above. However, according to an embodiment of the disclosure, the voice recognition server 400 may identify a control command corresponding to the user voice using the control command identification tool 141.

Figure 5:
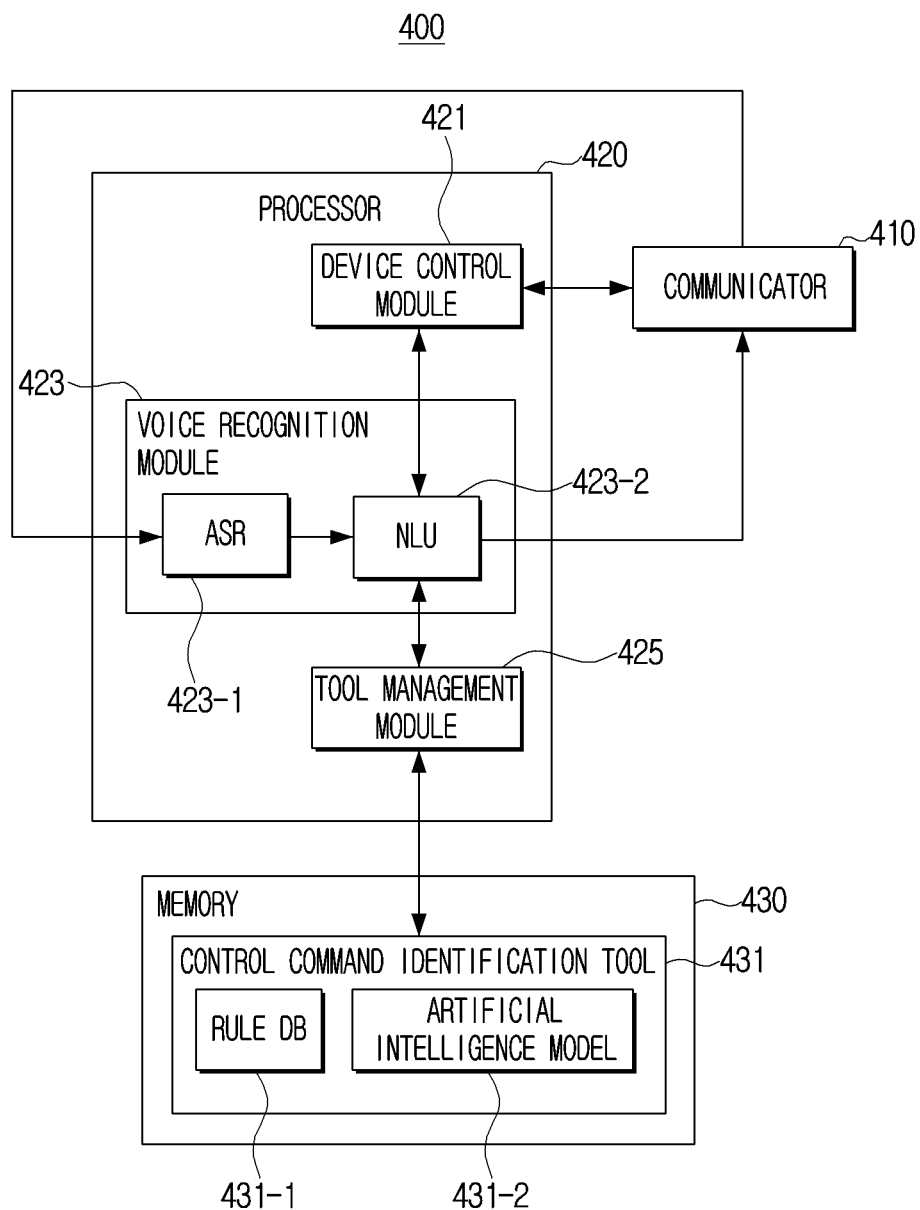
FIG. 5 is a block diagram illustrating a voice recognition server according to an embodiment of the disclosure.

FIG. 5 is a block diagram illustrating a voice recognition server according to an embodiment of the disclosure.

Referring to 5, a voice recognition server 400 may include a transceiver or communicator 410, at least one processor 420, and a memory 430.

The communicator 410 may be configured to perform communication with various external servers or various devices. For example, the communicator 410 may communicate with the electronic apparatus 100 and the device control server 500 to transmit and receive various information or data such as user voice, user intention information, status information of external devices, control commands, or the like.

The memory 430 may store data or information in an electric or magnetic form so that the processor 420 may access stored data or information. For example, the memory 430 may store a control command identification tool 431 and its own policy, the basis for identifying the control command, a tool management module 425 for managing the control command identification tool 431, a voice recognition module 423 for performing the voice recognition function and identifying the control command, a device control module 421 for monitoring status information of the external devices 200-1 and 200-2 and transmitting and receiving control commands, or the like.

The processor 420 may control the overall operations of the voice recognition server 400. For example, the processor 420 may load the control command identification tool 431 stored in the memory 430, the tool management module 425, the voice recognition module 423, the device control module 421, or the like, to perform functions of each module.

For example, FIG. 5 illustrates that the processor 420 loads the device control module 421, the voice recognition module 423, and the tool management module 425 stored in the memory 430 to perform the corresponding functions.

Among the components illustrated in FIG. 5, components having the same name as those illustrated in FIGS. 2 and 4 may have the same content or operate identically to components illustrated in FIGS. 2 and 4. Hereinafter, duplicate descriptions of the same contents in FIGS. 2 and 4 as described above will be omitted, and differences will be mainly described.

Referring to FIG. 5, each component is the same as that of the electronic apparatus 100 of FIG. 2, except that there is no microphone. In the electronic apparatus 100, the user voice is received through the microphone 110, but in the voice recognition server 400, the user voice may be received from the electronic apparatus 100 through the communicator 410.

The voice recognition server 400 may directly identify a control command through its own policy, even when a rule corresponding to the acquired user intention information and status information of an external device does not exist in a rule DB 431-1, or even when the acquired user intention information and the status information of the external device are input, but a control command is not output. In this case, the voice recognition server 400 may directly transmit the control command identified by the NLU module 123-2 and may not need to receive the user voice from the outside through the communicator 410.

For example, when user voice is received from the electronic apparatus 100 through the communicator 410, the voice recognition module 423 may obtain user intention information by performing ASR and NLU on the received user voice to obtain user intention information, and receive the status information of the external device related to the acquired user intention information from the device control server 500 through the device control module 421.

Accordingly, the NLU module 423-2 may request the tool management module 425 to load the control command identification tool 431, and use the loaded control command identification tool 431 to identify a control command corresponding to the user voice as described in FIG. 2.

When the control command cannot be identified by using the control command identification tool 431, the NLU module 423-2 may transmit the acquired user intention information and status information of external devices to the tool management module 425. Also, the NLU module 723-2 may identify a control command using its own policy.

When a control command is identified through its own policy, the NLU module 423-2 may transmit the identified control command to the tool management module 425, and update the Rule DB 431-1 or an artificial intelligence model 431-2 as described in FIG. 2, based on the received user intention information, the status information of external devices, and a control command received from the NLU module 423-2.

As such, the updated rule DB and the artificial intelligence model may be used to identify control commands corresponding to the user voice received from the electronic apparatus 100 through the communicator 410 afterwards.

In general, a server device such as the voice recognition server 400 may have a large storage space and a high-speed computation speed compared to a client device such as the electronic apparatus 100.

Accordingly, the voice recognition server 400 may include the voice recognition module 423, including an ASR module 423-1, and an NLU module 423-2, having a large-capacity and high-performance, capable of processing various voices input in various situations at a desired speed.

However, the electronic apparatus 100 may have a limitation in the voice recognition module 423 that may result due to limitations in storage space or computational performance.

Accordingly, according to an embodiment of the disclosure, when a voice recognition process (ASR process and/or NLU process) with respect to a user voice is requested from the electronic apparatus 100, the voice recognition module 423 of the voice recognition server 400 may perform the voice recognition processing on the received user voice according to the request of the electronic apparatus 100, and transmit its result, in text form as a result of ASR processing or user intention information as a result of NLU processing, to the electronic apparatus 100 through the communicator 410.

FIG. 6 is a flowchart illustrating a control method of an electronic apparatus according to an embodiment of the disclosure.

Referring to FIG. 6, the electronic apparatuses 100 and 100' may store the control command identification tool 141 based on a control command identified by the voice recognition server 400 at operation S610.

The control command identification tool 141 may include (1) the rule DB 141-1 including at least one rule in which user intention information, status information of an external device, and a control command identified by the voice recognition server 400 are matched with each other, and may include (2) at least one of the artificial intelligence model 141-2 trained by inputting the user intention information and the status information of an external device, and outputting the control command identified by the voice recognition server 400.

When a user voice is received, the electronic apparatuses 100 and 100' may acquire user intention information by performing voice recognition processing on the received user voice at operation S620, and request the device control server 500 to receive the status information of the external device related to the acquired user intention information at operation S630.

Accordingly, the electronic apparatuses 100 and 100' may apply the acquired user intention information and the received status information of the external device to the control command identification tool 141 in order to identify a control command for controlling the device to be controlled at operation S640 and transmit the identified control command to the device control server 500 at operation S650.

For example, when a rule corresponding to the acquired user intention information and the received status information of the external device exists in the rule DB 141-1, the electronic apparatus 100 or 100' may identify a control command matched to the corresponding rule as a control command corresponding to the user voice.

If the corresponding rule does not exist in the rule DB 141-1, the electronic apparatus 100 or 100' may transmit the user voice to the voice recognition server 400, and accordingly, when the control command identified from the voice recognition server 400 is received, the electronic apparatuses may generate a new rule by matching the received control command with the acquired user intention information and the received status information of the external device, and update the generated new rule in the rule DB 141-1.

The electronic apparatuses 100 and 100' may identify a control command that inputs the acquired user intention information and the received status information of the external device to the artificial intelligence model 141-2, and that is outputted from the artificial intelligence model 141-2 as a control command corresponding to the user voice.

If the control command is not output from the artificial intelligence model 141-2, the electronic apparatuses 100 and 100' may transmit the user voice to the voice recognition server 400, and accordingly, if the identified control command is received from the voice recognition server 400, may retrain the artificial intelligence model based on the acquired user intention information, the received status information of external devices, and the received control command.

According to an embodiment of the disclosure, when the electronic apparatuses can specify a device to be controlled and an operation of the device to be controlled, the electronic apparatuses 100 and 100' may identify a control command based on the user intention information only with the user intention information based on the status information of the external device, without using the control command identification tool 141.

When the status information of a plurality of external devices related to an entity included in the user intention information is received from the device control server 500, the electronic apparatuses 100 and 100' may identify that the device to be controlled cannot be specified only by the user intention information, and identify a control command by using the control command identification tool 141.

The electronic apparatuses 100 and 100' may directly transmit the control command to the device to be controlled when the device to be controlled is a controllable device using an IR method.

According to various embodiments of the disclosure as described above, it may be possible to quickly and accurately control devices through a user voice in a multi-device environment.

According to an embodiment of the disclosure, the various embodiments described above may be implemented as software including instructions stored in a machine-readable storage media which is readable by a machine (e.g., a computer). The device may include the electronic apparatuses 100 and 100' or the voice recognition server 400 according to the disclosed embodiments, as a device which recalls the stored instructions from the storage media and which is operable according to the recalled instructions.

When the instructions are executed by at least one processor, the processor may directly perform functions corresponding to the instructions using other components, or the functions may be performed under a control of the processor. The instructions may include code generated or executed by a compiler or an interpreter. The machine-readable storage media may be provided in a form of a non-transitory storage media. In this case, 'non-transitory' means that the storage media does not include a signal and is tangible, but does not distinguish whether data is stored semi-permanently or temporarily in the storage media.

The methods according to various embodiments described above may also be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of online distribution, at least a portion of the computer program product may be at least temporarily stored or provisionally generated on the storage media, such as a manufacturer's server, the application store's server, or a memory in a relay server.

Further, each of the components (e.g., modules or programs) according to the various embodiments described above may include a single entity or a plurality of entities, and some subcomponents of the above-mentioned components may be omitted or other subcomponents may be further included with the various embodiments. Generally, or additionally, some components (e.g., modules or programs) may be integrated into a single entity to perform the same or similar functions performed by each respective component prior to integration. Operations performed by a module, a program module, or other component, according to various embodiments, may be performed in sequential or parallel manner, or both sequential and parallel manner, executed iteratively or heuristically, or at least some operations may be performed in a different order, omitted entirely, or other operations may be added.

While the disclosure has been shown and described with reference to various embodiments thereof, it will be understood by those skilled in the art that various changes in form and detail may be made therein without departing from the spirit and the scope of the disclosure as defined by the appended claims and their equivalents.

What is claimed is:

1. An electronic apparatus comprising:
a microphone;
a transceiver;
a memory configured to store a control command identification tool generated by using a control command identified by a voice recognition server that identifies the control command corresponding to a user voice received by the electronic apparatus; and
at least one processor configured to, based on the user voice being received through the microphone:
acquire user intention information by performing voice recognition processing on the user voice received through the microphone,
receive status information of an external device related to the acquired user intention information from a device control server configured to control a plurality of external devices through the transceiver,
identify a control command for controlling a device to be controlled among the plurality of external devices by applying the acquired user intention information and the received status information of the external device to the control command identification tool, and
transmit the identified control command to the device control server through the transceiver,
wherein the control command identification tool comprises a database (DB) in which the user intention information, the status information of the external device, and the control command identified by the voice recognition server are matched with each other,
wherein the at least one processor is further configured to, based on the acquired user intention information and the received status information of the external device being present in the DB, identify a control command as a control command corresponding to the user voice, and
wherein the at least one processor is further configured to:
based on the acquired user intention information and the received status information of the external device not being present in the DB, transmit the user voice to the voice recognition server through the transceiver,
based on the control command identified from the voice recognition server being received based on the user voice, generate a new rule by matching the received control command with the acquired user intention information and the received status information of the external device, and
update the generated new rule in the DB.

2. The electronic apparatus of claim 1,
wherein the control command identification tool comprises an artificial intelligence model trained by using the user intention information and the status information of the external device as an input and by using the control command identified by the voice recognition server as an output, and
wherein the at least one processor is further configured to:
input the acquired user intention information and the received status information of the external device into the trained artificial intelligence model, and
identify a control command output from the trained artificial intelligence model as a control command corresponding to the user voice.

3. The electronic apparatus of claim 2, wherein the at least one processor is further configured to:

based on the control command not being output from the trained artificial intelligence model in which the acquired user intention information and the received status information of the external device are input, transmit the user voice to the voice recognition server through the transceiver, and based on the control command identified from the voice recognition server being received through the transceiver based on the user voice, retrain the trained artificial intelligence model based on the received status information of the external device and the received control command.

4. The electronic apparatus of claim 1, wherein the at least one processor is further configured to, based on the device to be controlled and an operation of the device to be controlled being specified only by the acquired user intention information based on the received status information of the external device, identify the control command based on the acquired user intention information without using the control command identification tool.

5. The electronic apparatus of claim 4,
wherein the acquired user intention information comprises information on an entity, and
wherein the at least one processor is further configured to, based on status information of a plurality of external devices related to the entity being received from the device control server:
identify that the device to be controlled is not specified only by the acquired user intention information, and
identify the control command by using the control command identification tool.

6. The electronic apparatus of claim 1,
wherein the transceiver comprises an infrared (IR) communication module, and
wherein the at least one processor is further configured to, based on the device to be controlled being controllable by an IR control method, transmit the identified control command to the device to be controlled through the IR communication module.

7. A control method of an electronic apparatus comprising:
storing a control command identification tool generated by using a control command identified by a voice recognition server configured to identify the control command corresponding to a user voice received by the electronic apparatus;
based on the user voice being received through a microphone of the electronic apparatus, acquiring user intention information by performing voice recognition processing on the user voice received through the microphone;
receiving status information of an external device related to the acquired user intention information from a device control server configured to control a plurality of external devices;
applying the acquired user intention information and the received status information of the external device to the control command identification tool;
identifying a control command for controlling a device to be controlled among the plurality of external devices; and
transmitting the identified control command to the device control server,
wherein the control command identification tool comprises a database (DB) in which the user intention information, the status information of the external device, and the control command identified by the voice recognition server are matched with each other,
wherein the identifying of the control command comprises, based on the acquired user intention information and the received status information of the external device being present in the DB, identifying a control command as a control command corresponding to the user voice, and
wherein the method further comprises:
based on the acquired user intention information and the received status information of the external device not being present in the DB, transmitting the user voice to the voice recognition server,
based on the control command identified from the voice recognition server being received based on the user voice, generating a new rule by matching the received control command with the acquired user intention information and the received status information of the external device, and
updating the generated new rule in the DB.

8. The method of claim 7,
wherein the control command identification tool comprises an artificial intelligence model trained by using the user intention information and the status information of the external device as an input and by using the control command identified by the voice recognition server as an output, and
wherein the identifying of the control command comprises:
inputting the acquired user intention information and the received status information of the external device into the trained artificial intelligence model, and
identifying a control command output from the trained artificial intelligence model as a control command corresponding to the user voice.

9. The method of claim 8, further comprising:
based on the control command not being output from the trained artificial intelligence model in which the acquired user intention information and the received status information of the external device are input, transmitting the user voice to the voice recognition server, and
based on the control command identified from the voice recognition server being received based on the user voice, retraining the trained artificial intelligence model based on the received status information of the external device and the received control command.

10. The method of claim 7, further comprising:
based on the device to be controlled and an operation of the device to be controlled being specified only by the acquired user intention information based on the received status information of the external device, identifying the control command based on the acquired user intention information without using the control command identification tool.

11. The method of claim 10,
wherein the acquired user intention information comprises information on an entity, and
wherein the method further comprises:
based on status information of a plurality of external devices related to the entity being received from the device control server, identifying that the device to be controlled is not specified only by the acquired user intention information; and
identifying the control command by using the control command identification tool.

12. The method of claim 7, further comprising:
based on the device to be controlled being controllable by an infrared (IR) control method, transmitting the identified control command to the device to be controlled.

* * * * *